United States Patent Office 3,679,598
Patented July 25, 1972

3,679,598
INSPECTION PENETRANT PROCESS AND COMPOSITIONS EMPLOYING MIXTURES OF FLUORESCENT INDICATOR DYE AND NON-FLUORESCENT ULTRAVIOLET ABSORBER DYE
James R. Alburger, 7356 Santa Monica Blvd., La Canada, Calif. 90046
No Drawing. Continuation-in-part of application Ser. No. 731,225, May 22, 1968. This application Sept. 14, 1970, Ser. No. 72,138
Int. Cl. G01n 21/16; G09k 1/02
U.S. Cl. 252—301.2 R                    2 Claims

ABSTRACT OF THE DISCLOSURE

An inspection penetrant process and inspection penetrant compositions which utilize mixtures of fluorescent indicator dyes and ultraviolet absorber dyes dissolved in liquid penetrant carrier materials. The penetrant composition disclosed may be used in the detection of surface defects in test objects in the presence of a background of shallow porosity indications. The novel combination of an ultraviolet absorber dye with a fluorescent indicator dye provides a relatively sharp transition of fluorescence response, with the result that the brightness response of porosity indications is selectively diminished without any substantial loss in the brightness of underlying crack indications, whereby the seeability contrast and detectability of actual crack indications is substantially improved.

RELATED PATENTS AND PATENT APPLICATIONS

U.S. Pat. No. 3,530,296, "Tracer Processes Employing Ultraviolet Absorber Materials."
U.S. Pat. No. 3,386,920, "Process for Fluorescence Detection of Extremely Small Flaws." (Now Reissue No. 26,888.)
U.S. Pat. No. 3,107,298, "Apparatus for the Measurement of Fluorescent Tracer Sensitivity."
U.S. Pat. No. 3,506,827, "Method of Masking Fluorescence in Fluorescent Dye Tracer Inspection Process Materials."
U.S. Pat. No. 3,184,596, "Flaw Detection Method Using a Liquid Solvent Developer."
U.S. Pat. No. 3,282,843, "Emulsifier Compositions."
U.S. Pat. No. 3,164,006, "Evaluation Performance of Liquid Penetrant Tracer Materials."
Appln. Ser. No. 799,701, filed Feb. 17, 1969, "Developers for Inspection Penetrants Employing Fusible Waxes," now U.S. Pat. No. 3,607,333.

The present application is a continuation-in-part of my copending application Ser. No. 731,225, filed May 22, 1968, for "Tracer Processes Employing Ultraviolet Absorber Materials," now issued Pat. No. 3,530,296. The present invention relates to inspection penetrant tracers which exhibit relatively sharp cutoff of fluorescent response in the characteristic dimensional transition of fluorescence.

Fluorescent indicator dyes are commonly used in inspection penetrant materials for the detection of extremely small crack defects in test objects, such as machine parts, bearings, jet engine turbine buckets, and the like. Fluorescent indicator dyes offer advantages over ordinary nonfluorescent visible color dyes in that they provide exceptionally good seeability contrast when inspection is carried out under black light in a semi-darkened inspection area. When thus employed for the detection of surface defects in test objects, a fluorescent sensitizer dye is used either alone or in combination with a color former dye, and is dissolved in a penetrant carrier liquid to a concentration sufficient to provide a desired dimensional level of sensitivity. The concentration of dye which is employed may be varied considerably, and the actual concentration which is utilized depends in part on the type of test objects which are being inspected and on the dimensional magnitude of surface defects which may be present.

In my now-issued patent, U.S. No. 3,386,920, now Reissue No. 26,888, for "Process for Fluorescence Detection of Extremely Small Flaws," I have disclosed procedures for adjusting and controlling the dimensional sensitivity of inspection penetrant materials and related tracer materials. Also, in my now-issued patent, U.S. No. 3,107,298, for "Apparatus for the Measurement of Fluorescent Tracer Sensitivity," I have disclosed techniques and apparatus for measuring and assigning numerical values to dimensional threshold characteristics of inspection penetrant materials. In accordance with these teachings of fluorescent penetrant usage, it has become possible to achieve relatively high levels of flaw detection sensitivity, such that extremely minute crack defects may be readily detected in test objects.

There are certain kinds of test objects, notably jet engine turbine buckets, which may contain extremely minute pinhole defects or crack defects, and these defects must be detected before the turbine bucket is installed in an engine and placed in service, otherwise a catastrophic failure of the engine might occur. Many of such turbine buckets are constructed to have on their surfaces a thin coating of heat-resistant material, and this coating of heat resistant material exhibits a characteristic of surface porosity. Accordingly, such test objects act as though their surfaces are covered with a mass of microscopic defect indications, and such surface porosity indications may oftentimes be so severe that they completely obscure any actual crack indications which may lie beneath the heat-resistant coating.

Up to the present time, it has become an increasingly more difficult problem to detect small crack defects in the presence of a condition of surface porosity. Attempts to increase the sensitivity of an inspection penetrant so as to detect extremely small crack defects merely serves to accentuate the indications of porosity which are present on the surface, and the end result is that there is no gain in the relative visual contrast of crack indications as compared to porosity indications.

The principal object of this invention, therefore, is to provide improved inspection penetrant materials for the detection of crack defects in the presence of background porosity indications.

Another object of the invention is to provide an improved inspection penetrant process utilizing novel inspection penetrant compositions which provide enhanced seeability contrast of crack defects in the presence of porosity indications.

These and other objects of the invention will in part be obvious and will in part become apparent from the following description thereof.

The present invention provides fluorescent penetrant inspection compositions, each of which is formulated essentially by dissolving in a suitable penetrant carrier liquid a combination of fluorescent dye component and an ultraviolet absorber component. For the purpose of the invention, I do not limit myself to any particular fluorescent dye material or combination of materials. I have found that it is possible to utilize any dye material such as is disclosed in my above-mentioned patent, Reissue No. 26,888. Also, I do not limit myself to any particular ultraviolet absorber materials; however, I may prefer to use one or more ultraviolet absorber substances selected from the group to be defined hereinbelow and at least to a given level of concentration and up to a maximum level of concentration depending on the degree of ultraviolet absorption effect which I may desire and which will be described.

For the purpose of the present invention, I make a clear distinction between fluorescent sensitizers such as are disclosed in the above-mentioned U.S. Pat. Re. 26,888 and ultraviolet absorber materials. The ultraviolet absorber materials, such as are employed in the compositions of the present invention, all act to absorb ultraviolet radiation, yet they do not exhibit any substantial amount of visible fluorescence. Conventional fluorescent dyes or the above-mentioned fluorescent sensitizers, on the other hand, absorb ultraviolet radiation and convert the absorbed radiant energy to a visible fluorescence.

For the purpose of measuring the dimensional sensitivity of a fluorescent material in solution, and also of determining the applicable physical constants thereof, I employ a Meniscus-Method instrument, which is described in my U.S. Pat. No. 3,107,298, for "Apparatus for the Measurement of Fluorescent Tracer Sensitivity." In practicing the invention disclosed in the latter patent, a flat black glass platen is positioned under a black light, and a few drops of liquid having dissolved therein, a fluorescent substance is placed on the platen. A convex clear glass lens having a preferred radius of curvature of 106 cm. is then placed over the puddle of liquid, and so as to rest on the platen. At the point of contact between the lens and the platen, the liquid film has a thickness of substantially zero, and a Meniscus-shaped film surrounds said contact point.

In order to evaluate the effect of ultraviolet absorption in thin films of solutions of ultraviolet absorber materials, a modification of the above-described Meniscus-Method setup may be employed as described in detail in my now-issued patent, No. 3,506,827, for "Method of Masking Fluorescence in Fluorescent Dye Tracer Inspection Process Materials." This modified Meniscus-Method setup is similar to the above-described setup, except that a fluorescent flat platen is employed instead of the black glass platen, and a test solution of ultraviolet absorber dye is applied between the convex lens and the fluorescent platen.

One suitable arrangement of a fluorescent flat platen is derived by applying a layer of fluorescent liquid onto a flat black glass platen and covering this layer with a thin flat cover glass. A Meniscus-shaped layer of ultraviolet absorber liquid and the convex clear glass lens is placed above this cover glass. When a thus-constructed sandwich assembly is irradiated from above by ultraviolet light, the portions of the Meniscus-shaped liquid layer which acts to absorb ultraviolet radiation will cast a shadow on the flat fluorescent platen.

As was pointed out in my U.S. Pat. No. 3,107,298, the thickness of the Meniscus-shaped layer of dyed liquid as employed in the Meniscus-Method varies continuously with the radial distance from the contact point between the convex lens and the flat platen. However, in all solutions of dye materials, be they fluorescent dyes, visible color dyes, or ultraviolet absorber dyes, there always occurs a characteristic of response transition which is seen in the Meniscus-Method setup as a spot of nonresponsive liquid surrounding a contact point between lens and platen.

If the geometry of the Meniscus-Method setup is known, then it is possible to determine the thickness of the liquid film at any measured radial distance from the contact point between lens and platen. For a condition where the convex lens has a radius of 106 cm., the thickness of a liquid layer, in millimicrons, at a radial distance $r$, in millimeters, from the contact point between lens and platen is given by the relationship:

$$t = 472r^2$$

In modern refined versions of usage of the Meniscus-Method apparatus, it has been found convenient to measure the diameter of the spot of nonresponsive liquid material at the point of half brightness, and the determination of this half brightness point, or inflection point on the curve of response transition condition is readily reproducible. The thus-determined spot diameter is a convenient measure of penetrant sensitivity performance capability.

The characteristic response transitions which are observable in the Meniscus-Method setup are, in effect, Beer's law transitions of response. That is, they would correspond to Beer's law assuming that Beer's law holds true for fluorescence response and ultraviolet absorption in thin films. Beer's law states that the relative intensity of transmitted radiation through a layer of dyed liquid is given by the relationship:

$$\frac{I_0}{I} = e^{-\alpha t} = e^{-\lambda C t}$$

where

I = transmitted intensity
$I_0$ = incident intensity
$e$ = base of natural logarithms
$\alpha$ = extinction coefficient
$\lambda$ = a constant
$C$ = dye concentration
$t$ = thickness of the dyed layer If we divide the dye content of the liquid into two components, one fluorescent and the other a nonfluorescent ultraviolet absorber, then Beer's law takes the form:

$$\frac{I}{I_0} = e^{-(\alpha + \alpha')t} = e^{-(\lambda C + \lambda' C')t}$$

where $\alpha$ is the extinction coefficient for the fluorescent dye and $\alpha'$ is the extinction coefficient for the ultraviolet absorber dye.

The dimensional transition of fluorescence response in a solution of mixed dyes is a function of the concentration of the fluorescent dye component alone, whereas the fluorescent brightness of the dye mixture is a function of the relative absorption of the fluorescent component with respect to the total absorption of both fluorescent and nonfluorescent components. Hence, if $\lambda C$ and $\lambda' C'$ have a known ratio, then the fluorescent brightness of the mixture should be predictable according to Beer's law. Furthermore, if the behaviour of the dyes accurately followed Beer's law, then the introduction of an ultraviolet absorber dye into a solution of fluorescent dye would serve merely to depress the fluorescent brightness and would not alter the effective shape of the response transition curve.

I have discovered that most dyes fail to conform accurately to Beer's law, and I have made use of this failure of Beer's law in thin films in connection with compositions and processes as set forth in my U.S. Pat. No. 3,184,596, for "Flaw Detection Method Using a Liquid Solvent Developer," and also in my copending application, Ser. No. 799,701, filed Feb. 17, 1969, for "Developers for Inspection Penetrants Employing Fusible Waxes." For the purpose of the present invention, I have discovered that mixtures of fluorescent indicator dyes and ultraviolet absorber dyes provide response characteristics which exhibit a considerable departure from the characteristics which would be expected if Beer's law were to hold true. This departure from Beer's law and the resultant advantageous feature of penetrants employing mixtures of dyes which fail to conform to Beer's law may be best understood by referring to an example given as follows:

EXAMPLE 1

A water-washable penetrant of the type described and claimed in my U.S. Pat. No. 3,282,843, for "Emulsifier Compositions," was prepared using a fluorescent dye component which yielded a Meniscus-Method spot diameter of 3.68 millimeters and a brightness reading under typical intensity level of ultraviolet irradiation of 90 footlamberts. To a 16 oz. (one pint) portion of this penetrant, there was added an ultraviolet absorber dye in an amount sufficient to suppress the brightness response to about 45 footlamberts, or about half the initial brightness. The ultraviolet absorber dye utilized in this example was a substituted acrylonitrile dye material supplied commercially under the designation Uvinul N-35. The concentration employed was 6 grams of dye per pint of penetrant. It was found that similar results were obtainable by the use of other ultraviolet absorber dyes, as for example, a substituted benzotriazol dye supplied commercially under the designation Tinuvin 328. In addition, it was found that similar results were obtainable by use of any conventional type of penetrant vehicle, including the commonly known water-insoluble post-emulsifiable penetrant liquids.

It was found that the addition of the ultraviolet absorber dye to the penetrant mixture had no effect whatsoever on the apparent spot diameter as measured by the Meniscus Method. This is to say that the inflection point of transition of fluorescence was not shifted by the addition of ultraviolet absorber. A separate solution was prepared by dissolving the acrylonitrile-type absorber dye to a concentration of 6 grams per pint in dimethyl naphthalene, and the spot diameter in this solution was measured using the Meniscus Method. The spot diameter was found to be 21.5 millimeters.

According to Beer's law, addition of the above amount (6 grams per pint) of ultraviolet absorber dye to the fluorescent penetrant should have caused a depression of the maximum fluorescent brightness by only a few percent, whereas, in reality, the fluorescent brightness was depressed by a factor of about 50%. More important, it was discovered that the suppression of fluorescent response was more pronounced in the toe region of the transition curve than in the shoulder region of this curve.

A side-by-side comparison test was made of defect detection performance using the two above-described penetrant compositions. This side-by-side test was carried out on a ceramic test block of the type described and claimed in my now-issued patent, No. 3,164,006, for "Evaluation Performance of Liquid Penetrant Tracer Materials." The test block used for the comparison tests consisted of a circular disc of unglazed ceramic material. The surface of the disc is characterized by the presence of many thousands of minute pores and surface fractures having different dimensional magnitudes ranging from a few millimicrons to several microns in size.

The ceramic block chosen for this test contained numerous extremely small shallow surface porosities along with a number of relatively large surface discontinuities. One-half of the ceramic block was coated with the fluorescent penetrant containing no ultraviolet absorber dye, and the other half of the ceramic block was coated with the penetrant sample containing the combination of fluorescent dye and ultraviolet absorber dye. After a normal dwell time to allow the penetrant to penetrate into any surface porosities and crack defects, the ceramic block was washed clean in water and was immediately dried with paper towelling and was examined under black light. It was found that in the case of the portion of the block treated with fluorescent penetrant without ultraviolet component, a normal pattern of fine pinpoint porosity indications was observed. However, on the portion of the test block treated with the penetrant containing both ultraviolet absorber dye and fluorescent dye, a distinct suppression of fine porosity indications occurred.

It was further noted that this suppression of porosity indications was not merely an optical illusion due to the effective reduction of fluorescent brightness of defect indications as the result of adding an ultraviolet absorber dye. A careful analysis of the porosity pattern on the two halves of the ceramic block surface by a technique of photographic reproduction of the porosity pattern and compensation of differences in fluorescence brightness by appropriate photographic exposure control showed that the fine porosity indications in the area treated with penetrant containing a combination of fluorescent dye and ultraviolet absorber dye were in fact suppressed in brightness to a considerable extent.

Further tests of the same penetrant materials on jet engine turbine buckets having heat resistant coatings on their surfaces showed that the amount of background fluorescence due to the porosity condition on the surfaces of the turbine buckets was considerably suppressed by reason of the presence of an ultraviolet absorber dye. At the same time, the brightness of actual crack indications was not materially affected.

As a result, the seeability contrast of actual crack indications against a background of porosity indications was greatly enhanced. This enhancement of seeability of crack indications is, of course, of vital importance with respect to a reliability in detecting potential failure defects in critical parts. As pointed out above, the fact that a suppression of background porosity indications may be achieved without a corresponding suppression in brightness of larger crack indications is quite unexpected and is, of course, not predicted by accepted laws of optical physics. It is pointed out that there are known to be numerous deviations and so-called "failures" of Beer's law, particularly in cases where concentrations of dyes are high or where dyes tend to interact optically with one another in the same solution. Such failures of Beer's law have in the past been entirely unpredictable.

I have discovered that a wide variety of ultraviolet absorber materials exhibit the desired feature of selective suppression of porosity indications as described above. Many of the more useful ultraviolet absorber materials, which absorb ultraviolet radiation without emitting any substantial amount of visible fluorescence, are derivatives of benzophenone. Among such derivatives are:

4,4'-bis-(dimethylamino)-benzophenone (Michler's Ketone)
4,4'-bis-(diethylamino)-benzophenone
2,4-dihydroxy-benzophenone
2-hydroxy-4-methoxy-benzophenone
2,2'-dihydroxy-4,4'-dimethoxy-benozphenone
2,2'-4,4'-tetrahydroxy-benzophenone
2-hydroxy-4-methoxy-benzophenone-5- sulfonic acid
2,2'-dihydroxy-4-methoxy-benzophenone
2-hydroxy-4-methoxy-5-sulfobenzophenone-trihydrate
sodium, 2,2'-dihydroxy-4,4'-dimethoxy-5-sulfobenzophenone
2,2'-dihydroxy-4-n-octoxy-benzophenone
2-hydroxy-4-methoxy-2'-carboxybenzophenone Certain other dyes or dye-type materials may also be used in formulating compositions of the invention, a few examples of such materials being any one of various acrylonitrile-derivitive dye-stuffs or various triazine dye-stuffs. Several useful ultraviolet absorber materials have been disclosed in U.S. Pats. Nos. 2,653,109 and 2,171,427. A few examples of such useful materials are:

2,3-diphenyl-quinoxaline
2,3-diphenyl-6-methylquinoxaline
ethylene glycol disalicylate
5,7-dibromo-8-hydroxyquinoline
sodium salt of bis[2-hydroxy-4-phenylamino-1,3,5-triazyl-(6)]-benzidine-disulfonic acid
sodium salt of 1,4-bis-[2-hydroxy-4-phenylamino1,3,5-triazyl-(6)-amino]-benzidine-disulfonic acid
2(2'-hydroxy-5'-methylphenyl)benzotriazole
2-(3',5'-ditert-butyl-2'-hydroxyphenyl)-5-chlorobenzotriazole It will be understood that the present invention contemplates inspection penetrant processes and process materials which employ indicator dye mixtures which are a combination of a fluorescent component and a nonfluorescent absorber dye component. It is, of course, obvious that different fluorescent dyes and different ultraviolet absorber dyes are characterized by differences in their solubility features and other physical properties. Accordingly, a selection of a particular combination of dye materials for use in the compositions of the invention would depend in part on the solvent characteristics of the penetrant carrier liquid. Inasmuch as most of the conventionally used penetrant carrier liquids are oily in nature, it turns out that oil soluble dye materials have the greatest practical importance for penetrant usage. However, some penetrant materials are of the so-called water base type, and therefore certain of the available water-soluble fluorescent dyes and ultraviolet absorber dyes would be useful in connection with penetrant liquid carrier materials of this kind.

In defining the range of useful concentrations for the dye materials which may be employed, it is not at all necessary to define such ranges in terms of unit weight per unit volume. It is more convenient and more practical to define the useful range of dye concentration in terms of dimensional threshold of response which is obtained. This is because various dyes differ considerably with respect to their strength or response characteristics. Also, a given dye may be supplied by a manufacturer in a wide variety of strengths depending on the ultimate use intended for the dye. Now that the Meniscus Method apparatus, U.S. Pat. No. 3,107,298, is available for evaluating the performance of dye solutions, it is not at all necessary to define dye performance in terms of its physical concentration, as for example, grams per pint, as has heretofore been necessary.

It is now known that for purposes of penetrant usage, it is desirable that a fluorescent dye be utilized at a concentration such that the inflection point of fluorescence transition be at a dimensional magnitude smaller than about 20 microns.

The upper limit of dimensional sensitivity is set by the so-called sensitivity index of the dye and its solubility in the penetrant liquid, and for most practical purposes it is found that the most sensitive ultra-sensitive inspection penetrants provide inflection point magnitudes of about .1 micron.

With regard to nonfluorescent ultraviolet absorber dyes, the proportional amount of dye which may be used for purpose of the invention may vary considerably, depending on the specific dye which is employed and on the concentration of the fluorescent component of the dye mixture. Here again, it is unnecessary and even undesirable to define the amount of ultraviolet absorber dye in terms of grams per pint or other unit measure. Instead, it is more appropriate to define the amount of ultraviolet absorber dye which is employed in terms of the extent to which the ultraviolet absorber dye depresses the maximum fluorescent brightness of the dye mixture. This is because it is not possible to apply Beer's law to the dye mixture and predict with accuracy the effect which the presence of the ultraviolet absorber dye has in depressing fluorescent brightness of indications.

In general, I have found that an ultraviolet absorber dye may be employed in combination with a fluorescent component in an inspection penetrant in such a way as to suppress the maximum fluorescent brightness of the mixture to a value of from about 5 percent to 95 percent of the initial value; that is, for purposes of the invention. When an ultraviolet absorber dye is utilized in such a way and in such a concentration as to provide a degree of brightness supression within the above-stated range of magnitudes, then I have found that a useful suppression of background porosity indications is obtained.

EXAMPLE 2

This example illustrates how an inspection penetrant formulation may be constructed to provide a selective suppression of background indications. For purposes of this example, a value of brightness suppression of 50% was selected.

The first step in the procedure was to prepare a pair of ten power microscope objectives mounted in a revolving nosepiece microscope assembly having a known ratio of optical transmission, in this case the lens pair consisting of a full-aperture lens and a half-aperture lens. The lens pair was made by using an adjustable rotating sector wheel, adjusted to 50% average optical transmission of a light beam. The half-aperture lens was precisely adjusted to 50% transmission compared with the full aperture lens by inserting a 50% transmission electroformed screen in the lens and comparing the thus-prepared lens with the full-aperture lens by photoelectric measurement of the amount of light transmitted through the lenses and sector wheel. Proper adjustment of the half-aperture lens was obtained when the brightness of the light transmitted through the rotating sector wheel and the full aperture lens was the same as that transmitted by the half-aperture lens with the sector wheel stationary.

The above-described set of microscope objectives and the microscope assembly was positioned above a microscope stage on which there was placed a black glass specimen plate. Specimens of test penetrant were then applied in small puddles on this plate, being irradiated by means of a 100 watt black light spot lamp. A photocell light detector was plugged into the microscope tube so as to obtain qualitative readings of fluorescent brightness of the puddles of test liquid on the microscope stage.

A fluorescent water-washable penetrant was prepared using a water-washable vehicle of the type described in my U.S. Pat. No. 3,282,843. The fluorescent dye component in this penetrant consisted of a fluorescent sensitizer dye, C.I. Fluorescent Brightening Agent No. 68 to a concentration of 10 grams per pint, and a color-former dye C.I. Fluorescent Brightening Agent No.75 to a concentration of 2.5 grams per pint.

A pint sample of the above penetrant was measured out and an acrylonitrile-type ultraviolet absorber dye (Uvinul N–35) was dissolved therein to a concentration of 6 grams per pint, sufficient to depress the brightness response of the penetrant to 50% of its initial value. The concentration figure of 6 grams per pint was arrived at by a series of tests using different concentrations of ultraviolet absorber dye until an appropriate concentration was found which produced the desired 50% depression of fluorescent brightness as measured by means of the calibrated pair of microscope objective lenses. At the correct point of 50% brightness depression, the light meter reading of the full-brightness liquid using the half-aperture lens is the same as the light meter reading of the half-brightness liquid using the full aperture lens.

Having accurately determined the concentration of the acrylonitrile ultraviolet absorber dye necessary to provide a 50% depression of fluorescent brightness, the dimensional transition of absorption response (at inflection) was determined for this dye concentration by using the modified Meniscus-Method setup as described above. As stated above, the ultraviolet absorber spot diameter at inflection was 21.1 millimeters, and the corresponding liquid film thickness (at inflection) was 52.5 microns.

A second test was carried out using the same fluorescent penetrant, but with a benzotriazole-type ultraviolet absorber dye (Tinuvin 328). In this case, the appropriate dye concentration for 50% brightness depression was found to be 18 grams per pint. Also, a determination of absorption transition (at inflection) was made for this dye concentration, and the Meniscus-Method spot diameter was found to be 4.68 millimeters, corresponding to a liquid film thickness of 477 millimicrons.

It is clear from the above outlined experiment that the two ultraviolet absorber dyes yield drastically different results in their absorption response transition features, and neither material behaves in a manner which even approximately conforms to Beer's law. Both of the above compositions containing ultraviolet absorber dye were found to give similar performance results in depressing unwanted porosity indications in test objects. Similar tests on a large number of ultraviolet absorber dyes, as listed herein, showed that all provided selective depression of background porosity indications to a useful degree. In addition, tests of penetrants containing varying amounts of ultraviolet absorber dye, sufficient to provide values of brightness depression of from as little as 5% to as much as 95%, and in all cases a depression of background porosity indications was noted.

Certain useful inspection penetrants may have concentrations of a fluorescent dye component as small as .1 gram per pint. The same may be true of the ultraviolet absorber dye component. The upper limit of concentration in either case is limited only by the maximum degree of solubility of the particular dye which is employed.

In the foregoing specification, it will be understood that the term "fluorescent dye component" may include mixtures of fluorescent sensitizer dye and color former dye materials, as described in my above-mentioned Pat. Re. 26,888.

It will be further understood that the term "ultraviolet absorber dye component" refers to nonfluorescent normally colorless ultraviolet absorber materials which may be used in conjunction with the above-stated fluorescent dye component.

I claim:

1. A fluorescent inspection penetrant composition for use in detecting defects open to the surface of a test object comprising a liquid penetrant carrier and a mixture of indicator dyes dissolved in said carrier, said dye mixture consisting of a fluorescent component present in a concentration sufficient to provide a dimensional transition of fluorescence smaller than about 20,000 millimicrons and a nonfluorescent ultraviolet absorber component present in a concentration sufficient to depress the maximum fluorescent brightness of said fluorescent component to a value of from about 5% to 95% of said maximum brightness, said nonfluorescent ultraviolet absorber component being at least one member selected from the group consisting of benzophenone, acrylonitrile, quinoxaline, disalicylate, hydroxyquinoline, triazine, triazyl, and triazole derivatives.

2. In an inspection penetrant process, the step of applying to a test surface a penetrant composition comprising a liquid penetrant carrier and a mixture of indicator dyes dissolved in said carrier, said dye mixture consisting of a fluorescent component present in a concentration sufficient to provide a dimensional transition of fluorescence smaller than about 20,000 millimicrons and a nonfluorescent ultraviolet absorber component present in a concentration sufficient to depress the maximum fluorescent brightness of said fluorescent component to a value of from about 5% to 95% of said maximum brightness, said nonfluorescent ultraviolet absorber component being at least one member selected from the group consisting of benzophenone, acrylonitrile, quinoxaline, disalicylate, hydroxyquinoline, triazine, triazyl, and triazole derivatives.

References Cited
UNITED STATES PATENTS

| | | | |
|---|---|---|---|
| 2,653,109 | 9/1953 | Switzer et al. | 252—301.2 |
| 2,778,741 | 1/1957 | Weber | 252—301.2 |
| 3,506,827 | 4/1970 | Alburger | 252—301.2 |
| 3,518,205 | 6/1970 | Vukasovich | 252—301.2 |

OTHER REFERENCES

Bitzer et al.: Chem. Abstracts, 54 (1960), columns 8089–90.

TOBIAS E. LEVOW, Primary Examiner

A. P. DEMERS, Assistant Examiner

U.S. Cl. X.R.

73—104; 250—71 T